United States Patent [19]

Alexander

[11] 4,369,657
[45] Jan. 25, 1983

[54] GRAVIMETER

[76] Inventor: Samuel T. Alexander, 272 Morada La., Santa Barbara, Calif. 93105

[21] Appl. No.: 285,592

[22] Filed: Jul. 21, 1981

Related U.S. Application Data

[63] Continuation-in-part of Ser. No. 108,487, Dec. 31, 1979, abandoned.

[51] Int. Cl.³ ............................................. G01V 7/04
[52] U.S. Cl. ................................................ 73/382 R
[58] Field of Search .................................. 73/382 R

[56] References Cited

U.S. PATENT DOCUMENTS

| | | | |
|---|---|---|---|
| 1,975,516 | 10/1934 | Nicolson | 73/382 |
| 1,995,305 | 3/1935 | Hayes | 73/382 |
| 2,301,396 | 11/1942 | Graf | 73/382 |
| 2,590,740 | 3/1952 | Walsh | 73/382 |
| 2,613,536 | 10/1952 | Jakosky | 73/382 |

FOREIGN PATENT DOCUMENTS 164684 1/1965 U.S.S.R. ............................. 73/382

Primary Examiner—James J. Gill
Attorney, Agent, or Firm—Harry W. Brelsford

[57] ABSTRACT

A gravity meter is formed by securing two parallel rods of different material at adjacent ends and indicating their differential elongation at the free ends. While capacitor, interferometer, and other devices could be used to measure this differential, the presently preferred indicator is a roller disposed between the free ends and the rotation due to differential elongation is indicated optically by a mirror attached to the roller. The indicator is zeroed while the rods are horizontal and the difference in elongation of the two rods is indicated when the rods are moved to a vertical position. The device may be moved over the earth's surface in the vertical position, while held at a constant temperature, to become a gravity meter.

7 Claims, 7 Drawing Figures

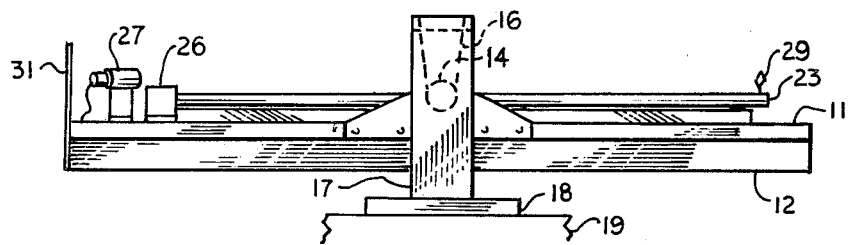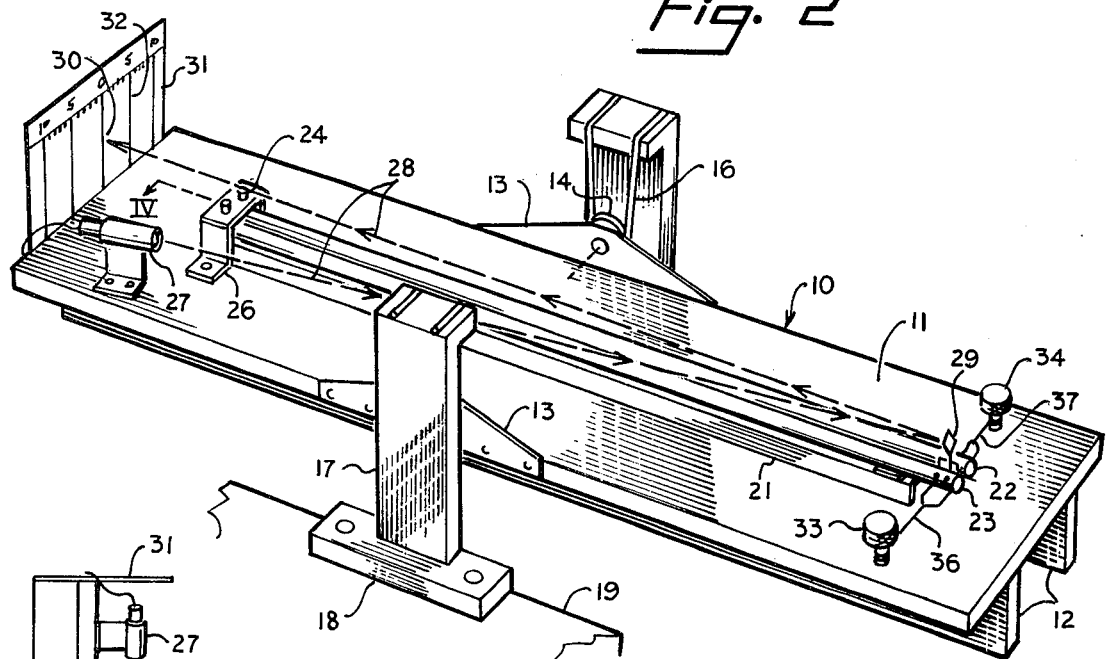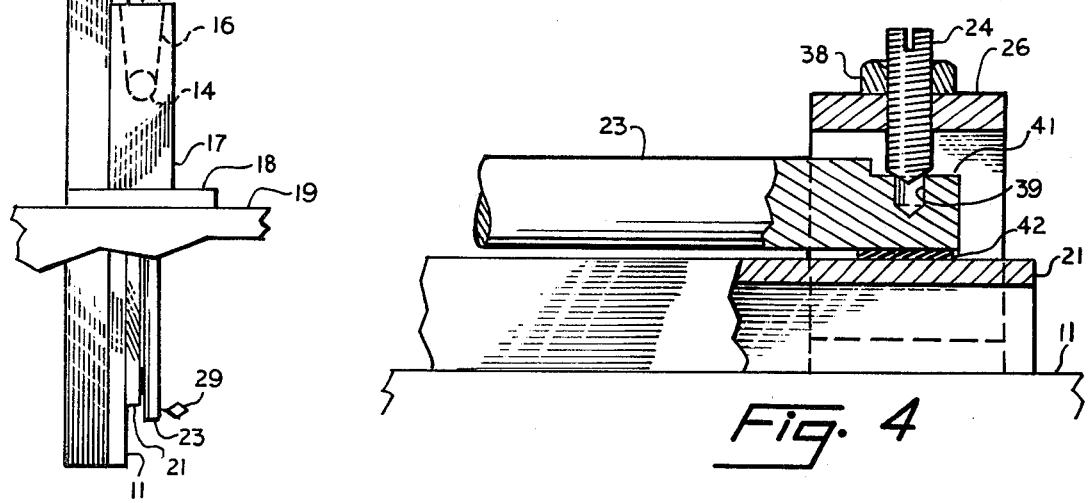

GRAVIMETER

This application is a continuation-in-part of my co-pending U.S. patent application Ser. No. 108,487 filed Dec. 31, 1979, now abandoned.

This invention relates to gravimeters and has particular reference to apparatus wherein the length of a rod is measured while in a horizontal position and the length of the same rod is measured while in a vertical position.

Variables enter into the measurements by gravimeters and have to be corrected to a standard. The principal variation occurs with changes in altitude of the measuring instrument, as gravity at a selected point on the earth's surface will decrease if the gravimeter is carried above a point on the surface and will increase if carried below the surface as in a mine or well hole. These reflect differences of distance from the center of gravity of the earth. Also, the materials of most gravity meters change their physical dimensions and sometimes physical properties with changes in temperature, and, accordingly, these temperature changes must be compensated or the instrument must be held at a fixed temperature for readings at two or more different places on the earth's surface. Also, it is important to protect the instrument from vibration as a harmonic vibration could cause a false reading and vibrations in other ranges can distort the reading.

BRIEF SUMMARY OF THE INVENTION

It is well known that rods of different materials supported at their top ends elongate differently under the effect of gravity when rotated from a horizontal to a vertical position and that the amount of elongation can be related to the normally recognized properties of materials such as Young's modulus, specific weight or density of the material, linear coefficient of expansion, specific heat, etc.

It has long been recognized that a vertical rod held at its upper end elongates due to gravity acting on its mass, and this is the reason that exact physical measurements of materials are made on surfaces that are accurately horizontal.

This gravitational elongation differs for rods of the same length, but of different materials. Some materials elongate more than others, and some are closely similar. By selecting two rods of materials having different values for Young's modulus, I achieve a differential elongation as the rods are moved from a horizontal to a vertical position. This differential elongation may be more easily measured or indicated than the elongation of a single rod. I presently prefer to secure to a table rotatable from a horizontal position two parallel rods of the same length. Rods of different lengths may be used, but this requires an additional computational factor. The rods may be secured at their top ends (when vertical) or their bottom ends (when vertical). The suspended rods will have an elongation due to their weight. The bottom supported rods will contract due to their weight. However, the temperature of the rods must remain constant during any measurement, as the rods will expand or contract due to temperature, in accordance with well known data.

Various differential measuring devices may be used to measure the differential elongation of my rods, such as the plates of a capacitor, interferometers, mechanical-optical equipment, strain gauges, etc. The differential measurement of the elongation makes it unnecessary to measure the exact elongation rod, but this could, of course, be done to obtain the same result.

DETAILED DESCRIPTION

Various objects, advantages, and features of my invention will be apparent in the following description and claims, considered together with the accompanying drawings forming an integral part of the specification and in which:

FIG. 1 is a three-dimensional view of a presently preferred form of the invention showing a table in a horizontal position that is rotatable to a vertical position and upon which two parallel rods are secured.

FIG. 2 is an elevation view on a reduced scale of the table of FIG. 1.

FIG. 3 is a side elevation view on a reduced scale of the table of FIG. 1 when it is rotated to a vertical position.

FIG. 4 is a partial sectional view through the upper or left hand support for one of the rods of FIG. 1 as viewed along the line IV of FIG. 1.

Figure 5:
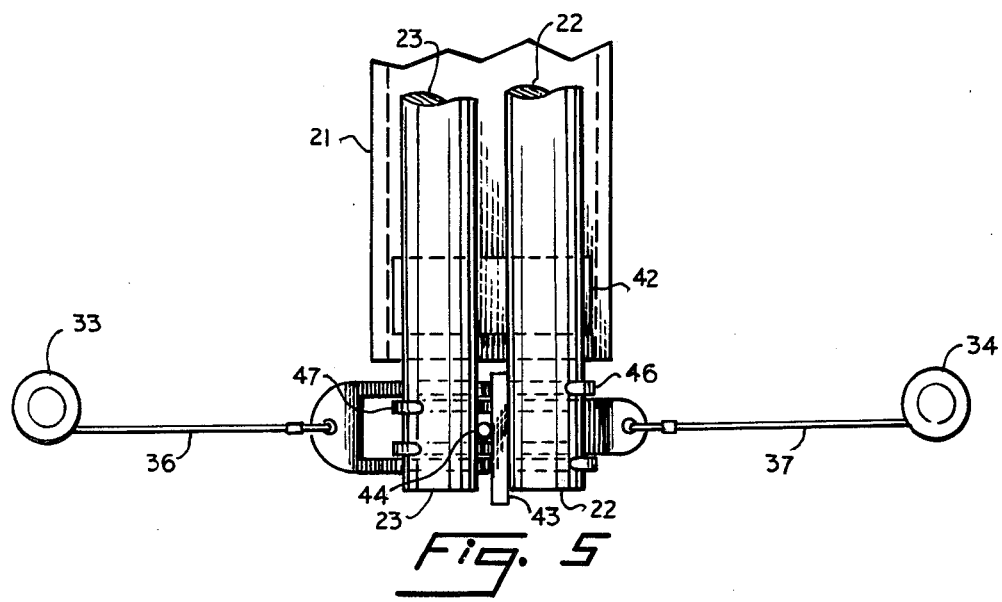
FIG. 5 is a top view on an enlarged scale of the right-hand end of the rods of FIG. 5 showing the tensioning mechanism for holding the rods against a rotatable shaft or roller.

Referring to FIGS. 1, 2, and 3 a table 10 has tabletop 11 stiffened by runners 12 secured to the bottom thereof, and projecting about midpoint of the table are a pair of flanges 13 to which are secured rotatable pulleys 14. The pulleys in turn are supported by loops of cord 16, preferably braided nylon or other synthetic filaments. These loops 16 are supported by an upright standards 17 secured to bases 18, which in turn are secured to opposite sides of foundation 19. The support of the table 10 by the braided nylon cord allows for absorption of bearing irregularities and forces arising from improper alignment of the pivot. The nylon cord also insulates the table from vibrations of the foundations 19. Disposed on the top of the tabletop 11 is a channel 21 of aluminum or other metal which acts as a bed upon which are disposed a pair of parallel rods 22 and 23 provided particularly for the invention. The right ends of the rods as viewed in FIG. 1 are free to move linearly and are secured to the tabletop 11 at the left end by means of set screws 24 screwed in to a bridge 26 and engaging holes in each of the rods, as shown in more detail in FIG. 4. Disposed adjacent bridge or clamp 26 is a light source 27 having a carefully collimated pinpoint light ray 28 projecting therefrom to contact a mirror 29 at the right end of the rods as viewed as in FIG. 1, which mirror in turn reflects the light ray 28 to form a spot 30 on a screen 31 having graduations 32 marked thereon. It is the change of the location of the light spot 30 on the screen 31 which indicates the differential elongation of the two rods 22 and 23, as the table is moved from horizontal to vertical position.

Referring to the right end of the table of FIG. 1, there are illustrated two hand capstans or rotatable spindles that are frictionally engaged by the tabletop 11. These are adjustably rotated to determine the tension on the filaments 36 and 37, respectively, that hold the ends of the two rods 22 and 23 close together as shown in more detail in FIGS. 5 and 6.

Referring to FIG. 4, there is illustrated the section through FIG. 1 along the line IV showing the rod 23 held by the set screw 24, which may be locked in any position by a locknut 38. The set screw 24 engages a hole 39 bored into a flat 41 on the end of the rod 23. All measurements of length of the rod 23 for purposes of the invention are made from the center of the hole 39. Disposed on top of the channel 21 is a shim 42 of a brass or other thin metal which elevates the rods 22 and 23 to give them friction-free movement of elongation. A similar shim 42 may be disposed on top of the channel on the other ends of rods 22 and 23.

Figure 6:
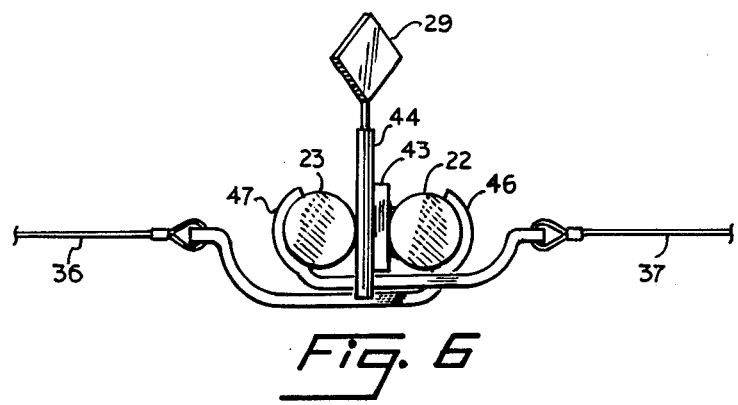
FIG. 6 is an end view of the structure of FIG. 5.

Illustrated in FIGS. 5 and 6 is the mechanism for rotating the mirror 29 as the rods 22 and 23 differentially elongate. Glued or otherwise secured to rod 22 may be a rectangular piece of glass or other flat material 43. Rolling on the flat 43 is a roller or spindle 44 to which the mirror 29 is glued or otherwise secured. The other rod 23 is held tightly against the roller 44 by virtue of the elastic filaments 36 and 37 to which interfitting pairs of claws 46 and 47 are connected respectively. The adjustment of tension on the filaments 36 and 37, which may be plastic monofilament, is made by rotating the hand capstan 33 and 34 as previously mentioned. The roller 44 is preferably made of a hard material, and I presently prefer a short length of music wire. The tension on the filaments 36 and 37 must be such that the rod 23 is not dented by the hard roller 44.

OPERATION

The operation of the devices of FIGS. 1 through 6 is as follows. The table 10 is first held in a horizontal position as shown in FIG. 1, and this must be accurately horizontal as determined by level or other suitable means. The light 27 is thereupon energized, and the beam of light 28 travels to the mirror 29 and is reflected to the screen 31. If it is desired to zero the light beam on the screen 31 as shown, this could be done by manually rotating the roller 44 (FIG. 6) until the light spot is zeroed. Thereafter, the table is rotated to a vertical position as shown in FIG. 3, and this vertical position must be accurately determined by any suitable means such as by levels. The rods 22 and 23 being of different materials will elongate because of gravity and will elongate different amounts because of the difference in material between them. This differential elongation may be visualized best on FIG. 5, and this causes the roller 44 to rotate, which in turn causes a corresponding angular movement to mirror 29, which then displaces the light spot 30 on the screen 31 depending on the direction of rotation of the roller 44. The screen 31 may be graduated according to the particular length of rods 22 and 23 being used, and the reading is then noted from the graduation lines 32 on the screen 31. The rods 22 and 23 will elongate differently because of their own mass and the different materials in each rod.

The same measurements may be made by rotating the table of FIG. 1 in a counterclockwise direction so that the ends of the rods secured by the set screws 24 are downward. In this case, the difference in rod lengths will come from shortening the rods by one-half the weight of the material of the rods.

In operating the device of FIGS. 1 through 6, it is essential that the temperature not vary over a period of time long enough to get a homogeneous temperature for each of the rods and all of the component parts of the apparatus. Furthermore, this temperature maintenance must be preserved during the measuring period of time.

It is also essential to shield the apparaus from external heat sources at the time of measurement, such as body heat of the person attending the equipment, any incandescent lights, etc., and for this purpose the rods may be insulated from heat flow after the homogeneous temperature has been achieved. In this connection, the wattage of the light source 27 should be kept extremely low to reduce any additional heat to the equipment. I found that it is practical to maintain the uniformity of the temperature during any one measurement after the preceding soaking time to $\pm 0.01°$ C.

Figure 7:
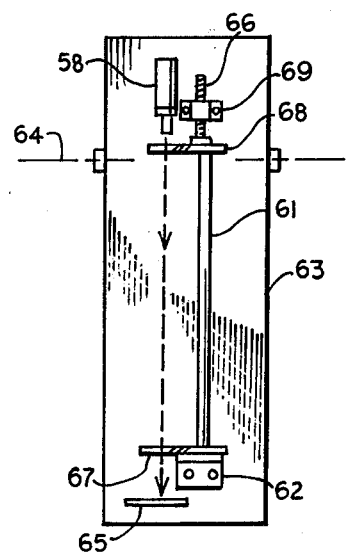
FIG. 7 is an elevation view of a schematic diagram wherein a bottom supported vertical rod has its absolute length measured by a Fabry-Perot interferometer.

Illustrated in FIG. 7 is a modification of the invention wherein a rod 61 rests on its bottom on a partial reflector 67 supported by an angle 62 secured to a rotatable table about an axis 64. A coherent monochromatic light source 58 may be disposed at the upper end of the rod 61 for measuring the length of the rod in both the vertical and the horizontal positions. The location of the upper end of the rod 61 is determined by a partial reflector 68. The position of the reflector 68 with respect to the end of the rod is minutely adjusted by means of a hand screw 66 threaded into a block 69. A screen 65 is secured to the table 63 below the semi-mirror 67.

The device of FIG. 7 measures the changes in the length of the rod directly whether in horizontal or vertical positions, but eliminates any elongation of the table 63 itself due to gravitational sagging. The device of FIG. 7 must have subtracted from the reading the calculated compression due to the weight of the rod 61 based on standard or average gravity.

I have described my invention with respect to a presently preferred embodiment thereof and presently preferred modifications as required by the statutes. These are illustrative only of my invention, and the invention is not limited thereto. The following claims, therefore, include all variations and modifications that come within the true spirit and scope of my invention. A photoelectric device may be substituted for the screen 31.

I claim:

1. A gravimeter comprising:
   (a) a table movable from a horizontal to a vertical position;
   (b) a pair of elastic rods of dissimilar material disposed parallel to each other on the table;
   (c) means for supporting adjacent ends of the rods when the table is rotated to a vertical position;
   (d) and means for measuring the differential change in length of the rods at the other ends of the rods as the table is rotated from a horizontal to a vertical position.

2. A gravimeter as set forth in claim 1 wherein the table is supported by at least one shock-absorbing device to isolate the table from surrounding vibrations.

3. A gravimeter as set forth in claim 1 wherein said means for measuring the differential elongation includes a roller disposed between the rods at said other ends and in contact with said other rod ends to be rotated by the differential change in length, said rotation thereby indicating the differential change.

4. A gravimeter as set forth in claim 3 wherein the roller has a mirror secured thereto and a light source is secured to the table to impinge light on the mirror and a screen is secured to the table upon which the reflected light impinges to measure the differential change in length of the rods.

5. A gravimeter as set forth in claim 3 having adjustable resilient means for urging said other rod ends against the roller.

6. A gravimeter as set forth in claim 1 wherein mechanical means are provided for rotating the table from a horizontal position to a vertical position.

7. A gravimeter comprising:

(a) a pair of parallel rods of dissimilar materials;
(b) means for supporting adjacent ends of the rods when held in a vertical position;
(c) and means for measuring the differential change in the length of the rods at the other ends of the rods as the rods are rotated from a horizontal to a vertical position.

* * * * *